US011914598B2

(12) United States Patent
Ren et al.

(10) Patent No.: US 11,914,598 B2
(45) Date of Patent: Feb. 27, 2024

(54) EXTENDED SYNOPSIS PRUNING IN DATABASE MANAGEMENT SYSTEMS

(71) Applicant: SAP SE, Walldorf (DE)

(72) Inventors: Qingwei Ren, Xi'an (CN); Weimin Qi, Xi'an (CN); Zhe Qu, Xi'an (CN); Xiaoke Liu, Xi'an (CN); Jiaxin Liu, Xi'an (CN); Zhilong Hao, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/826,986

(22) Filed: May 27, 2022

(65) Prior Publication Data

US 2023/0385282 A1    Nov. 30, 2023

(51) Int. Cl.
*G06F 16/24* (2019.01)
*G06F 16/2455* (2019.01)
*G06F 16/22* (2019.01)

(52) U.S. Cl.
CPC ...... *G06F 16/24554* (2019.01); *G06F 16/221* (2019.01); *G06F 16/2282* (2019.01)

(58) Field of Classification Search
CPC .............................................. G06F 16/24554
USPC ....................................................... 707/802
See application file for complete search history.

(56) References Cited

U.S. PATENT DOCUMENTS

| 11,461,347 | B1* | 10/2022 | Das ................... G06F 16/2433 |
| 2020/0026695 | A1* | 1/2020 | Yan ........................ G06F 7/08 |
| 2020/0334232 | A1* | 10/2020 | Arye .................... G06F 16/215 |
| 2021/0406251 | A1* | 12/2021 | Kläbe ................. G06F 16/2456 |

FOREIGN PATENT DOCUMENTS

CN    109086450 A  * 12/2018 ............... G06F 8/72

* cited by examiner

*Primary Examiner* — Syling Yen
(74) *Attorney, Agent, or Firm* — Fountainhead Law Group P.C.

(57) ABSTRACT

Computer-readable media, methods, and systems are disclosed for database table partition pruning based on statistical information associated with non-partition columns. A tree partition specification is received defining partitions for a plurality of computed column statistics. Respective partitions are created for the plurality of computed column statistics based on the tree partition specification. A request is received to compute statistics for a plurality of columns of the plurality of computed column statistics to result in a plurality of computed column statistics. In response to determining that one or more modifications have been made to the partitioned database, the plurality of computed column statistics is marked as invalid. The computed column statistics are refreshed in response to modifications of the partitioned table. Thereafter, the statistics are marked as valid. Unnecessary table partitions are pruned based on the statistics, and the associated query is executed.

20 Claims, 6 Drawing Sheets

EXTENDED SYNOPSIS PRUNING IN DATABASE MANAGEMENT SYSTEMS

TECHNICAL HELD

Embodiments generally relate to synopsis pruning in database management systems, and more particularly to mechanisms for database table partition pruning based on statistical information associated with non-partition columns in database queries in connection with a legacy query engine.

In modern database systems, there is often a strong demand for storing a large amount of data in a single table, which is a common user requirement, and can help simplify database modeling. In existing database management systems, there are typically design limitations with respect to a maximum number of records that a single table can store. Accordingly, database administrators have a requirement to split their data into separate tables to overcome a corresponding limitation regarding a number of records that can be stored in a single table. Corresponding problems are encountered in response to a requirement to query data over multiple tables, i.e., by way of a relational database management system join. To provide greater record storage and an overall improved user experience, there is a need for mechanisms to overcome such limitations. One such mechanism involves the use of partitioned table. In some database management systems, a partitioned table consists f multiple internal database tables, each internal table serving as a logical partition. As such a partitioned table can hold many more records than a single conventional database table. In the context of partitioned tables, there are frameworks to control data distribution among partitions associated with a partitioned table, which are called partitioning types, e.g., partitioned by HASH, ROUNDROBIN, RANGE or composite types like HASH-RANGE, ROUNDROBIN-RANGE, RANGE-RANGE, etc.

When executing a query on a partitioned database table, a query engine may ignore, or prune, those partitions not needed to generate query results. Accordingly, partition pruning can vastly accelerate query execution on a partitioned database table. Such partition pruning may be accomplished by pre-computing information regarding the contents of the partitioned database table partitions. In synopsis-based partition pruning implementations, a database system may maintain statistical synopsis information for features of partition key values for individual data partitions and use the synopsis information to determine whether to prune a particular data partition during execution of a query.

In some instances, a partition schema for specifying how a partitioned database table is partitioned may be necessary for a query engine to utilize statistical synopsis information. If the partition schema changes, a legacy query engine may still be able to execute a query on a partitioned database table, but that legacy query engine may not be able to properly interpret the statistical synopsis information, thereby preventing the legacy query engine from pruning partitions, Continued use of a legacy query engine may be desired for stability or other reasons, however if the legacy query engine cannot prune partitions, executing database engines with the legacy query engine may be unacceptably slow. Accordingly, what is needed is a method for database table partition pruning based on statistical information associated with non-partition columns in database queries performed by a legacy query engine, thereby addressing the above-mentioned problems.

SUMMARY

Disclosed embodiments address the above-mentioned problems by providing one or more non-transitory computer-readable media storing computer-executable instructions that, when executed by a processor, perform a method for database table partition pruning based on statistical information associated with non-partition columns in database queries, the method comprising: receiving a tree partition specification defining partitions for a plurality of computed column statistics, creating respective partitions for the plurality of computed column statistics based on the tree partition specification, receiving a request to compute statistics for a plurality of columns of the plurality of computed column statistics to result in a plurality of computed column statistics, in response to determining that one or more modifications have been made to the partitioned database, marking the plurality of computed column statistics as invalid, continually refreshing the computed column statistics in response to the one or more modifications of the partitioned database upon completion of the refreshing of the computed column statistics, marking the marking the plurality of computed column statistics as valid, and in response to receiving a query on the partitioned database table, pruning unnecessary table partitions from the query strategy based on the plurality of computed column statistics.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
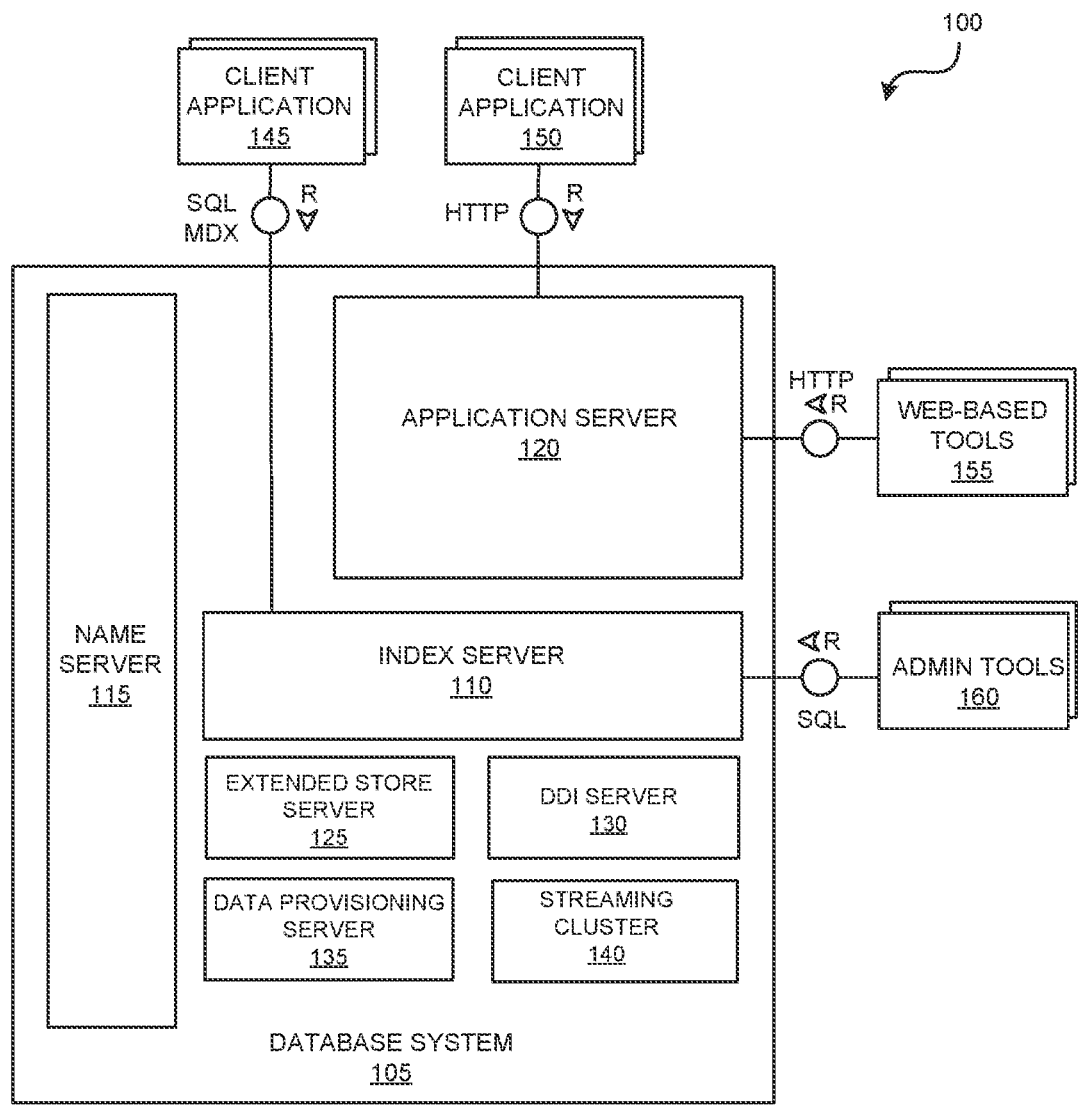
FIG. 1 is a system diagram illustrating an example database system for use in connection with the current subject matter.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

Range partitioning creates dedicated partitions for certain values or value ranges in a table. Usually, this requires an in-depth knowledge of the values that are used or valid for the chosen partitioning column. For example, a range partitioning scheme can be chosen to create one partition for each calendar month. Software applications using a partitioned database table may choose to use range partitioning to actively manage the partitioning of a partitioned table. That is, partitions may be created or dropped as needed. For example, an application may create a partition for an upcoming month so that new data is inserted into that new partition.

A range partitioning scheme usually takes ranges of values to determine a range of values that go into a particular partition, for example, values 1 to 10 or 1000 to 3000. It is also possible to define a partition for a single value. In this way, a list partitioning known in other database systems can be emulated and combined with range partitioning. When rows are inserted or modified, the target partition is determined by the ranges defined in the database schema. If a value does not fit into one of these ranges, an error may be raised. If this is not wanted, it is possible to define a partition others partition where all rows that do not match any of the defined ranges are inserted. Partition others partitions can be created or dropped on-the-fly as desired. Range partitioning is similar to hash partitioning in that the partitioning column must be part of the primary key. Uses of range partitioned tables may pre-define a partitioned table with different ranges of a column's value. For example, a table can be defined like this:

CREATE TABLE T1 (C1 INT, C2 INT) PARTITION BY RANGE (C1) (PARTITION 0<=VALUES<1000, PARTITION 1000<=VALUES<3000)

Data set (of column C1) between 0 and 1000 are inserted into partition 1, data set (of column C1) between 1000 and 3000 are inserted into partition 2. Other data set insertions are all disallowed and/or result in an error condition. As noted, it is possible for a database administrator to create a special partition "partition others" for data not fitting any of the pre-defined partitions. Such a DDL statement may be expressed as follows.

CREATE TABLE T1 (C1 INT, C2 INT) PARTITION BY RANGE (C1) (PARTITION 0<=VALUES<1000, PARTITION 1000<=VALUES<3000 PARTITION OTHERS)

As time goes on, and more records are stored, there still may be too many rows that need to be stored in the partition others partition, which leads to the original problem of not being able to store a sufficiently large number of rows in a conventional database table. Accordingly, database management systems consistent with the present teachings may provide a feature called linear interval-based dynamic range partitioning, which can automatically and continuously create new partitions based on a predetermined interval. In some embodiments, data from the partition others partition may be moved to the newly created partitions. In some embodiments, after re-distributing the existing rows from the partition others partition, the partition others partition may be emptied for future data insertions that do not fit into either the existing partitions or the new, dynamically created partitions. Such a dynamic range partitioning feature may be deployed in connection with a single-level range partitioning type, or even multi-level partitioning types for example HASH-RANGE, or RANGE-RANGE.

The subject matter of the present disclosure is described in detail below to meet statutory requirements: however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the present teachings in sufficient detail to enable those skilled in the art to practice the present teachings. Other embodiments can be utilized, and changes can be made without departing from the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments

FIG. 1 is a system diagram 100 illustrating an example database system 105 for use in connection with the current subject matter. Database system 105 can, for example, be an in-memory database in which all relevant data is kept in main memory so that read operations can be executed without disk I/O and in which disk storage is required to make any changes durable by way of persistent storage. Database system 105 can include a plurality of servers including, for example, one or more of index server 110, name server 115, and/or application server 120. Database system 105 can also include one or more of extended store server 125, database deployment infrastructure (DDI) server 130, data provisioning server 135, and/or streaming cluster 140. Database system 105 can be accessed by a plurality of client applications 145, 150 via different protocols such as structured query language (SQL) and/or multidimensional expressions (MSX), by way of index server 110, and/or web-based protocols such as hyper-text transport protocol (HTTP by way of application server 120.

Index server 110 may contain in-memory data stores and engines for processing data Index server 110 may also be accessed by remote tools (via, for example, SQL queries), that can provide various development environment and administration tools. Additional details regarding an example implementation of index server 110 is described and illustrated in connection with FIG. 2 below.

In some embodiments, name server 115 is responsible for information about various topologies associated with database system 105. In various exemplary distributed database systems, name server 115 provides descriptions regarding where various components are running and which data is located on which server. In connection with database system 105 having multiple database containers, name server 115 may provide information regarding existing database containers. Name server 115 may also host one or more system databases. For example, name server 115 may manage the information regarding existing tenant databases, which tenant databases are isolated from one another. Unlike name server 115 in a single-container database system, name server 115 in a database system 105 having multiple database containers does not store topology information such as the location of tables in a distributed database. In a multi-container database system 105 such database-level topology information can be stored as part of data catalogs associated with the various isolated tenant databases.

Application server 120 can enable native web applications used by one or more client applications 150 accessing database system 105 via a web protocol such as HTTP. In various embodiments, application server 120 allows developers to write and run various database applications without the need to provide an additional application server. In some embodiments, application server 120 can also be used to run web-based tools 155 for administration, life-cycle management, and application development. Other administration and development tools 160 can directly access index server 110 for, example, via SQL and/or other protocols.

In various embodiments, extended store server 125 can be part of a dynamic tiering option that can include a high-performance disk-based column store for very big data up to the petabyte range and beyond. Less frequently accessed data (for which is it non-optimal to maintain in main memory of the index server 110) can be maintained in connection with extended store server 125. Dynamic tiering associated with extended store server 125 allows for hosting of very large databases with a reduced cost of ownership as compared to conventional arrangements.

In various embodiments, DDI server 130 may be a separate server process that is part of a database deployment infrastructure. This infrastructure may be a layer of database system 105 that simplifies deployment of database objects using declarative design time artifacts, DDI can ensure a consistent deployment, for example by guaranteeing that multiple objects are deployed in the right sequence based on dependencies, and by implementing a transactional all-or-nothing deployment.

In some embodiments, data provisioning server 135 provides enterprise information management and enables capabilities such as data provisioning in real time and batch mode, real-time data transformations, data quality functions, adapters for various types of remote sources, and an adapter software design kit (SDK) for developing additional adapters. In various embodiments, streaming cluster 140 allows for various types of data streams (i.e., data feeds, etc.) to be utilized by database system 105. Streaming cluster 140 allows for both consumption of data streams and for complex event processing.

Figure 2:
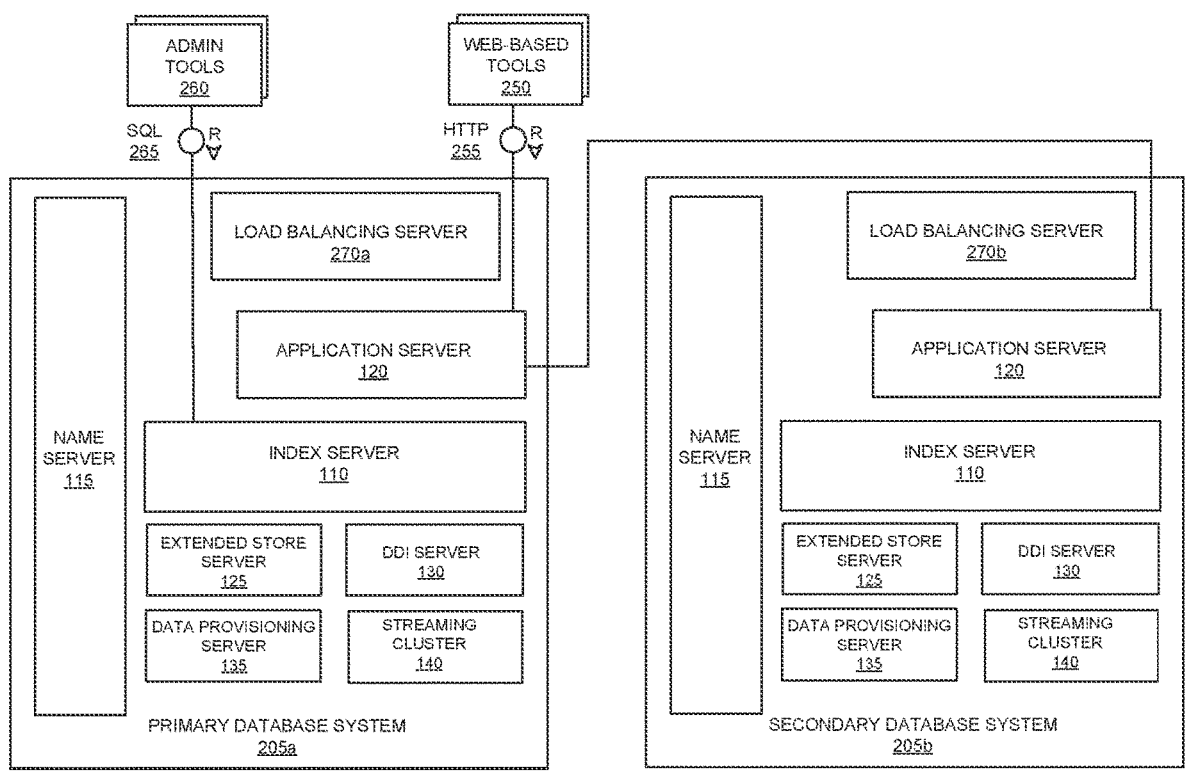
FIG. 2 is a system diagram illustrating an architecture to support load balancing between a primary database system and a secondary database system.

FIG. 2 is a system diagram illustrating an architecture 200 to support load balancing between a primary database system 205a and a secondary database system 205b consistent with the present teachings. Each of the primary system 205a and the secondary system 205b may be a single instance system, similar to database system 105 depicted in FIG. 1, or each may be a distributed variation of database system 105. Such an architecture may be useful in a high availability data system, or in a disaster recovery system, or in a combination high availability disaster recovery system.

Each of the primary system 205a and secondary system 205b may include a load balancing functionality. Such load balancing functionality may for example be contained within a distinct load balancing server 270a or 270b. But such load balancing functionality may be managed by any suitable processing system. For example, application server 120 of FIG. 1 may also manage the load balancing of requests issued to the application server of the primary system 205a, sending requests to the secondary system 205b as necessary to maintain a well-distributed workload.

As depicted in Fla 2, each of the primary system 205a and the secondary system 205b includes load balancing server 270a and 270b which respectively receive requests from user applications directed to the primary system 205a or the secondary system 205b. Such request may come from either admin tools 260 or web-based tools 250, or any other user application. Upon receiving a request, a load balancing server, e.g., load balancing server 270a, determines how to distribute associated workload. As depicted, load balancing server 270a routes an SQL request 265 from admin tools 260 to index server 110 of primary system 205a, while routing an HTTP request 255 from web-based tools 250 to application server 120 of secondary system 205b.

Load balancing of resources between primary system 205a and secondary system 205b may give rise to several complicating issues. For example, if either of requests 255, 265 requires writing to one or more data tables, or modifying a data table, then the two systems 205a, 205b may diverge. After many instances of write requests being distributed between primary system 205a and secondary system 205b, the two systems would be substantially inconsistent, and likely unsuitable as replacements for each other. In another example, an application request, e.g., 265, may perform a write transaction that is followed by a read transaction, e.g., 255, related to the data written by the write request 265. If the write request is allocated to the primary system 205a, the read request would obtain a different result depending on whether the subsequent read transaction is carried out by the primary system 205a or by the secondary system 205b.

Load balancing in a combination high availability disaster recovery system, by distributing a portion of the workload of a primary data system to a hot-standby or backup system should be carried out in a manner that would not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary system and a backup system should maintain the backup system in an identical, or nearly identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications. In some embodiments, snapshots may be employed to facilitate database system replication.

Figure 3A:
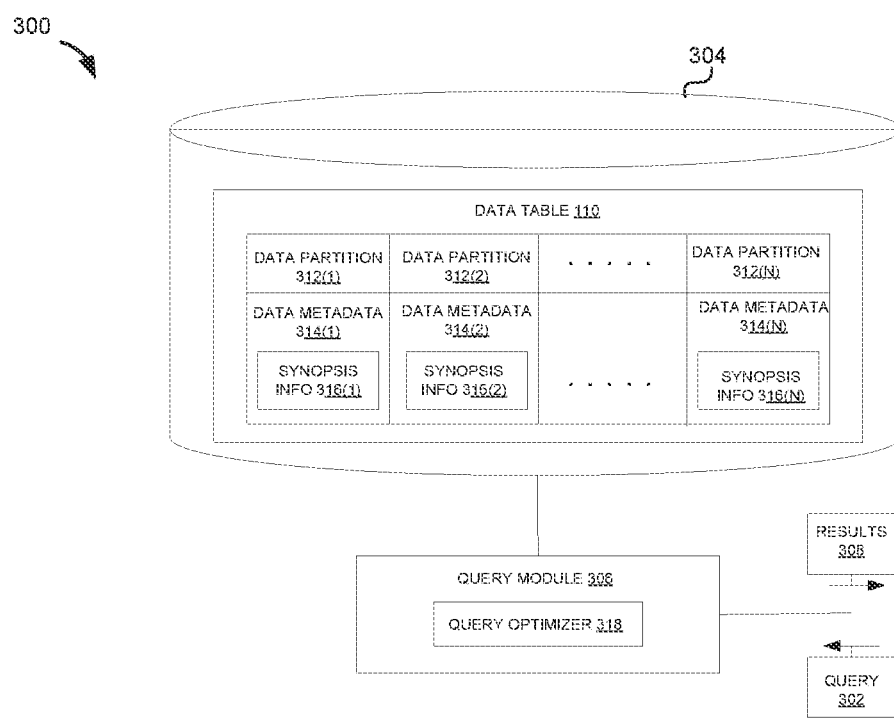
FIG. 3A is a block diagram illustrating an example query processing system with partition pruning capabilities, according to some embodiments.

FIG. 3A illustrates an example embodiment of a query processing system 300 that processes a query 302 over a data volume (e.g., the database 304). "Query," as used herein, refers to a semantic construction that facilitates gathering and processing information. Further, the query 302 may be expressed in a database query language, e.g., structured query language (SQL), an object query language, a natural language, and so forth. In some embodiments, a human user or a computer process seeking to retrieve data from the database 304 may provide the query 302 to a query module 306 of the query processing system 300. In response, the query module 306 may execute the query 302 and determine query results 308 including information from the database 304 corresponding to the query 302.

As illustrated in FIG. 3A, the database 304 includes a partitioned data table 310. The data table 310 is partitioned into N data partitions 312(1)-(N). Further, each data partition 312 is associated with data partition metadata 314. For instance, data partition 312(1) is associated with data partition metadata 314(1), data partition 312(N) is associated with data partition metadata 314(N), and so forth. The data partition metadata 314 includes detailed information about the contents of the data partitions 312. For example, the data partition metadata. 314(1) may describe one or more attributes (e.g., size, data values, data distribution, etc.) of the content of the data partition 312(1).

In some embodiments, the data partition metadata 314(1)-(N) includes synopsis information 316(1)-(N) for the data partitions 312(1)-(N). Further, the synopsis information 316 may include information identifying the minimum data value and maximum data value of an associated data partition 312. For instance, the synopsis information 316(1) may include the minimum data value and the maximum data value included in the data partition 312(1). In some embodiments, the data values can include at least one of an alphanumeric string, integer, decimal, floating point, date, time, binary, boolean, and/or enumeration.

As illustrated in FIG. 3A, the query module 106 includes a query optimizer 318 that may implement one or more performance measures to improve the performance of the query processing system 300 when processing the query 302. In some embodiments, the query optimizer 318 may implement partition pruning with respect to queries processed by the query process system 300. For example, the query optimizer 318 may prune the number of data partitions 312 that are accessed by the query module 306 when executing the query 302.

"Partition pruning," as used herein, refers to determining whether a data partition includes data that satisfies a query, and preventing a query module from loading the data partition into memory when the data partition does not include data that satisfies the query. As an example, the query optimizer 318 may analyze predicates (e.g., conditional statements associated with FROM and WHERE clauses) included in the query 302 to determine which partitions 312(1)-(N) should be retrieved and loaded into memory in order to execute the query 302. Partition pruning dramatically reduces the amount of data retrieved from disk and shortens processing time, thus improving query performance and optimizing resource utilization.

In some embodiments, the query optimizer 318 implements synopsis-based partition pruning in order to avoid the unnecessary loading of data partitions 312 unrelated to the query 302 during the execution of the query 302. As such, the query optimizer 318 may maintain the synopsis information 316(1)-(N). Additionally, the query optimizer 318 may prune the data partitions 312(1)-(N) based at least in part on the synopsis information 316(1)(N). For example, the query optimizer 318 may determine which data partitions 312(1)-(N) to load into memory during execution of the query 102 based on information describing the data partitions 312(1)-312(N) included in the synopsis information 316.

In one embodiment, the synopsis information 316(1)-(N) may be organized according to different types of synopsis strategies. For example, the synopsis information 316(1) may be organized in accordance with a first synopsis strategy (e.g., an equal length imprint (ELI) partition strategy), and the synopsis information 316(2) may be organized in accordance with second synopsis strategy (e.g., a zone map partition strategy). Some other synopsis strategies that may be utilized by the query optimizer 318 include dynamic bucket expansion and contraction algorithm, optimal binning algorithm, unbiased v-optimized algorithm, column imprints, etc.

Further, the query optimizer 318 may determine which synopsis strategy to apply to a data partition 312 based on one or more attributes (e.g., data distribution) of the content of the data partition 312. For example, the query optimizer 318 may maintain ELI synopsis information 316(1) for the data partition 312(1) based on the data partition metadata 314(1) indicating the presence of skewed data within the data partition 312(1). By applying the synopsis strategy best suited for a data partition 312, embodiments described herein further improve query execution and optimize resource utilization.

Additionally, the query optimizer 318 may determine which synopsis strategy to apply to the data partition 312(1) based upon monitoring the data partition metadata 314(1) associated with the data partition 312(1). For example, the data partition metadata 314(1) may track false negative rates and false positive rates of the synopsis information 316(1). Further, the query optimizer 318 may modify the synopsis strategy applied to the data partition 312(1) based upon the data partition metadata 314(1) indicating that false positive rate or the false negative rate is above a predetermined threshold. Additionally, or alternatively, the query optimizer 318 may modify the synopsis strategy applied to the data partition 312(1) based upon the data partition metadata 314(1) reflecting that an attribute of the data partition 312(1) renders another synopsis strategy better suited for pruning the partition.

For instance, the query optimizer 318 may apply a zone map synopsis strategy to uniformly distributed data or normally distributed data. Further, the query optimizer 318 may apply an EU synopsis strategy to skewed data. As such, the query optimizer 318 may monitor the content of the data partition 312(2) via the data partition metadata 314(2). If the data partition metadata 314(2) indicates that the data stored in data partition 312(2) is skewed, the query optimizer 318 may modify the synopsis information 316(2) in order to apply an ELI synopsis strategy to the data partition 312(2).

Consider the following example to illustrate how synopsis information may be stored in the form of statistics regarding values of non-partition columns of records stored in various range partitions of a partitioned database table. First a partitioned database table may be created as follows:

CREATE TABLE T1(a int, b int) PARTITION BY RANGE(A)
((
PARTITION 0<=VALUES<10,
PARTITION 10<=VALUES<20,
PARTITION OTHERS
))

Upon inserting records into the newly created partitioned database table, records will be placed into respective range partitions based on the inserted value of column "a." That is to say that inserting a record having (a=1, b=1) will cause a record to be inserted into the first partition. Inserting a record (a=5, b=5) will also cause a record to be inserted into the first partition. Inserting a record (a=11, b=2) will cause a record to be inserted into the second partition. And inserting a record (a=200, b=8) will cause a record to be inserted into the partition others partition. After these records are inserted into the partitioned database table, calculation of statistics may be initiated in the background by an automatic statistics calculation process associated with the database management system. Alternatively, a database administrator may execute a "CREATE STATISTICS" statement to trigger computation of statistics. Statistics may be recalculated periodically in the background by a background process or a database administrator may explicitly execute a "REFRESH STATISTICS" statement, Once the statistics are updated, they may be used for synopsis pruning. In the above example a query "SELECT * from T1 WHERE b>6" may employ synopsis pruning to prune partition one and partition 2, greatly improving performance.

Figure 3B:
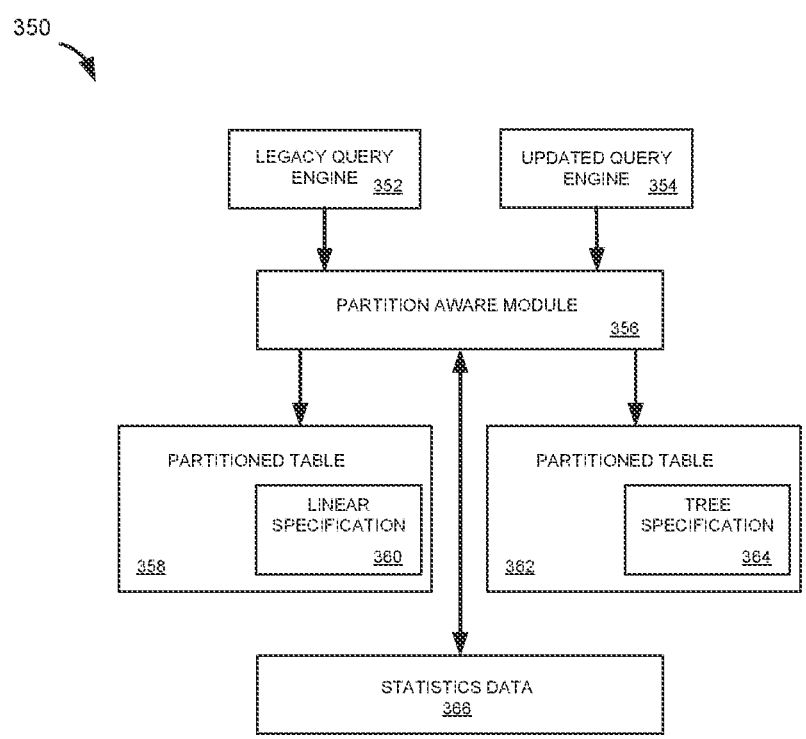
FIG. 3B is a block diagram illustrating examples of legacy and updated query engines with partition pruning capabilities, according to some embodiments.

FIG. 3B is a block diagram 350 illustrating an example legacy query engine 352 and updated query engine 354 with partition pruning capabilities, according to some embodiments. In some embodiments, update query engine 354 supports improved performance query processing on different types of partitioned database tables, such as partitioned table 358 and partitioned table 362. As illustrated, partitioned table 358 has partitions that are defined in connection with linear specification 360. Analogously, partitioned table 362 has partitions that are defined in connection with tree specification 364. A linear partition specification such as linear specification 360 may be created in connection with a DDL statement such as;

CREATE TABLE T1 (a int, b int) PARTITION BY RANGE(A) (PARTITION 0<=VALUES<10, PARTITION 10<=VALUES<20, PARTITION OTHERS)

A database management system internal representation of such a linear partition specification may be represented as a string in the form of "RANGE A 0-10, 10-20,*" By contrast, a tree partition specification may be more expressive and permit more complicated partition structures. Accordingly, a tree partition specification such as tree specification 364 may be created in connection with a DDL statement such as:

b. CREATE TABLE T1 (a int, b int) PARTITION BY RANGE(A) ((PARTITION 0<=VALUES<10, PARTITION 10<=VALUES<20, PARTITION OTHERS))

A corresponding database management system internal representation of such a tree partition specification may be represented by way of a more expressive language such as JavaScript Object Notation (JSON) taking the form of: "{"CompactPartitionSpec2":[[ ], ["RANGE",["A"]], [[["0", "10"],["10","20"],[ ]], [ ]]]}" Generally speaking, use of a tree partition specification would be preferable, due to its greater flexibility. Database administrators and users that employ updated query engine 354 would then typically create new partitioned database tables using a tree partition specification. In some embodiments, database management systems will, by default, create new partitioned database tables with tree partition specifications.

In some usage scenarios, however, users have a requirement to use a legacy query engine in connection with a database management system. Various reasons exist to justify a requirement to use a legacy query engine such as legacy query engine 352. In some cases, due to its recent development, updated query engine 354 may have certain defects that cause it not to be able to execute certain types of queries. In some cases, due to its recent development, updated query engine 354 may not be as stable as legacy query engine 352. However, because legacy query engine 352 was developed prior to the existence of partition specifications like tree specification 364, whenever legacy query engine 352 attempted to execute a query on a partitioned database table such as partitioned table 362 having a tree specification such as tree specification 364, partition aware module 356 would ignore statistics data 366. When ignoring statistics data 366, legacy query engine 352 cannot employ synopsis pruning to improve query performance. In some instances, not employing synopsis pruning will result in unacceptable performance. Accordingly, in connection with improvements consistent with the present teachings, partition aware module 356 may present statistics to legacy query engine 352 that enables legacy query engine 352 to perform synopsis pruning using statistics data 366. In some embodiments, partition aware module simulates a linear partition synopsis, making the fact that legacy query engine 352 is querying a partitioned table based on a tree partition specification. In some other embodiments, no simulation is necessary and legacy query engine 352 utilizes statistics data 366 directly based on the ranges present in system tables of the database management system.

Figure 4:
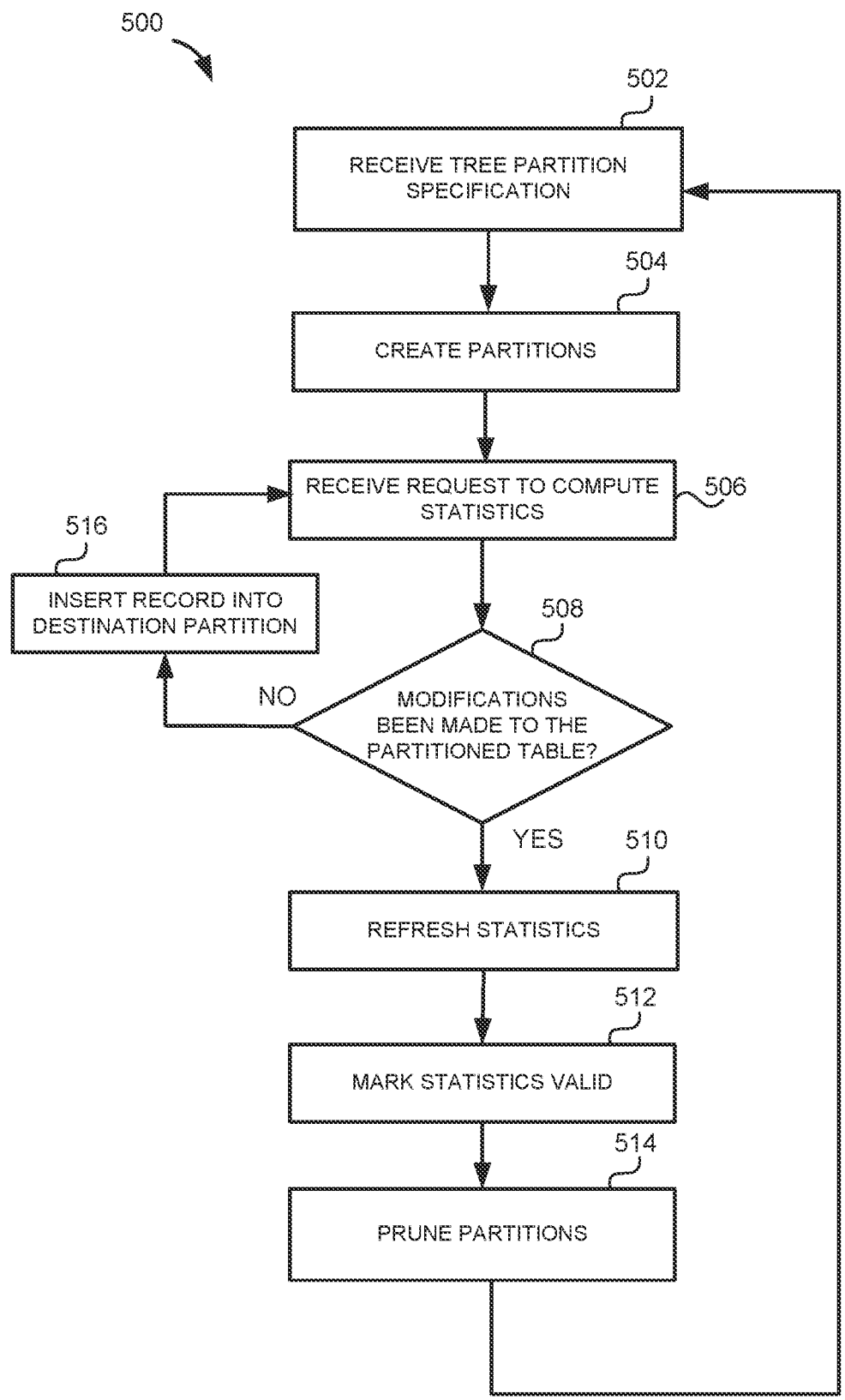
FIG. 4 is a flow diagram illustrating methods for database table partition pruning based on statistical information associated with non-partition columns in database queries performed by a legacy query engine.

FIG. 4 is a flow diagram 400 illustrating methods for database table partition pruning based on statistical information associated with non-partition columns in database queries performed by a legacy query engine. At step 402, a tree partition specification is received defining partitions for a plurality of computed column statistics. At step 404, respective partitions are created for the plurality of computed column statistics based on the tree partition specification. At step 406, a request is received to compute statistics for a plurality of columns of the plurality of computed column statistics to result in a plurality of computed column statistics. In response to determining (at test 408) that one or more modifications have been made to the partitioned database, marking the plurality of computed column statistics is marked as invalid. If at test 408, modifications have not been made, execution proceeds to step 416 where optionally one or more records is inserted into the partitioned database table and execution continues to step 406. At step 410, the computed column statistics are continually refreshed in response to the one or more modifications of the partitioned database. Upon completion of the refreshing of the computed column statistics, at step 412 the plurality of computed column statistics is marked as valid. Finally, at step 414 in response to receiving a query on the partitioned database table, unnecessary table partitions are pruned from the query strategy based on the plurality of computed column statistics. In some embodiments, the plurality of column statistics represent minimum and maximum values of non-partition column values as stored in records that are stored in various range partitions associated with the partitioned database table.

Figure 5:
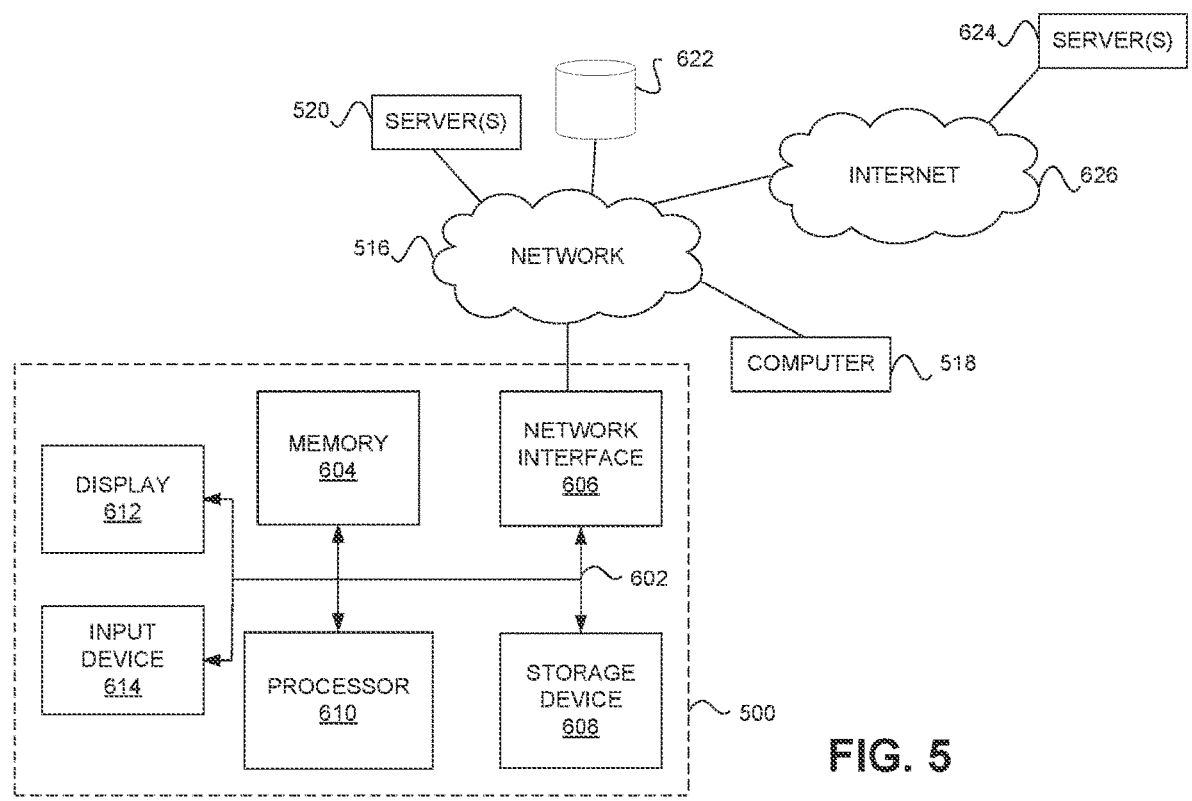
FIG. 5 is a diagram illustrating a sample computing device architecture for implementing various aspects described herein.

FIG. 5 is a diagram illustrating a sample computing device architecture for implementing various aspects described herein, Computer 500 can be a desktop computer, a laptop computer, a server computer, a mobile device such as a smartphone or tablet, or any other form factor of general- or special-purpose computing device containing at least one processor. Depicted with computer 500 are several components, for illustrative purposes. Certain components may be arranged differently or be absent. Additional components may also be present. Included in computer 500 is system bus 502, via which other components of computer 500 can communicate with each other. In certain embodiments, there may be multiple busses or components may communicate with each other directly. Connected to system bus 502 is processor 510, Also attached to system bus 502 is memory 504. Also attached to system bus 502 is display 512. In some embodiments, a graphics card providing an input to display 512 may not be a physically separate card, but rather may be integrated into a motherboard or processor

510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 is connected to system bus 502. Like display 512, these peripherals may be integrated into computer 500 or absent. Also connected to system bus 502 is storage device 508, which may be any form of computer-readable media, such as non-transitory computer readable media, and may be internally installed in computer 500 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 500 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, and network storage, such as cloud network storage. Network 516 is in turn connected to public Internet 526, which connects many networks globally. In some embodiments, computer 500 can itself be directly connected to public Internet 526.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "compute readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

Having thus described various embodiments of the invention, what is claimed as new and desired to be protected by Letters Patent includes the following:

1. One or more non-transitory computer-readable media storing computer-executable instructions that, when executed by a processor, perform a method for database table partition pruning based on statistical information associated with non-partition columns in database queries, the method comprising:
receiving a tree partition specification defining partitions for a plurality of computed column statistics;
creating respective partitions for the plurality of computed column statistics based on the tree partition specification;
receiving a request to compute statistics for a plurality of columns of the plurality of computed column statistics to result in a plurality of computed column statistics;
in response to determining that one or more modifications have been made to the partitioned database, marking the plurality of computed column statistics as invalid;
continually refreshing the computed column statistics in response to the one or more modifications of the partitioned database;
upon completion of the refreshing of the computed column statistics, marking the marking the plurality of computed column statistics as valid; and
in response to receiving, at a legacy query engine, a query on the partitioned database table, pruning unnecessary table partitions from a query strategy based on the plurality of computed column statistics,
wherein the method further comprises:
providing an updated query engine, wherein the updated query engine is able to employ pruning based on the tree partition specification, wherein the query comprises a first query, and wherein the query strategy comprises a first query strategy; and
in response to receiving, at the updated query engine, a second query on the partitioned database table, pruning unnecessary table partitions from a second query strategy based on the tree partition specification.

2. The non-transitory computer-readable media of claim 1, wherein pruning the unnecessary table partitions includes simulating a linear partition synopsis based on the tree partition specification.

3. The non-transitory computer-readable media of claim 1, wherein the tree partition specification is not represented as a string.

4. The non-transitory computer-readable media of claim 1, wherein the tree partition specification is expressively defined according to a data definition language (DDL) statement.

5. The non-transitory computer-readable media of claim 1, wherein the tree partition specification is expressively defined according to a JavaScript Object Notation (JSON) statement.

6. A method for database table partition pruning based on statistical information associated with non-partition columns in database queries, the method comprising:
receiving a tree partition specification defining partitions for a plurality of computed column statistics;
creating respective partitions for the plurality of computed column statistics based on the tree partition specification;
receiving a request to compute statistics for a plurality of columns of the plurality of computed column statistics to result in a plurality of computed column statistics;
in response to determining that one or more modifications have been made to the partitioned database, marking the plurality of computed column statistics as invalid;
continually refreshing the computed column statistics in response to the one or more modifications of the partitioned database;
upon completion of the refreshing of the computed column statistics, marking the marking the plurality of computed column statistics as valid; and
in response to receiving, at a legacy query engine, a query on the partitioned database table, pruning unnecessary table partitions from a query strategy based on the plurality of computed column statistics,
wherein the method further comprises:
providing an updated query engine, wherein the updated query engine is able to employ pruning based on the tree partition specification, wherein the query comprises a first query, and wherein the query strategy comprises a first query strategy; and
in response to receiving, at the updated query engine, a second query on the partitioned database table, pruning unnecessary table partitions from a second query strategy based on the tree partition specification.

7. The method of claim 6, wherein the query comprises one or more conditions including one or more key values.

8. The method of claim 7, wherein the query comprises one or more conditions including one or more key values.

9. The method of claim 6, further comprising:
receiving an automatic trigger to initiate computation of updated statistics; and
computing the updated statistics.

10. The method of claim 9, wherein the continually refreshing the computed column statistics is carried out by a background process.

11. The method of claim 6, wherein the one or more modifications comprise a structured query language (SQL) insert statement.

12. The method of claim 6, wherein the plurality of computed column statistics is stored in one or more system tables.

13. The method of claim 6, wherein pruning the unnecessary table partitions includes simulating a linear partition synopsis based on the tree partition specification.

14. A system for database table partition pruning based on statistical information associated with non-partition columns in database queries, the system comprising:
at least one processor;
and at least one non-transitory memory storing computer executable instructions that when executed by the at least one processor cause the system to carry out actions comprising:
receiving a tree partition specification defining partitions for a plurality of computed column statistics;
creating respective partitions for the plurality of computed column statistics based on the tree partition specification;
receiving a request to compute statistics for a plurality of columns of the plurality of computed column statistics to result in a plurality of computed column statistics;
in response to determining that one or more modifications have been made to the partitioned database, marking the plurality of computed column statistics as invalid;
continually refreshing the computed column statistics in response to the one or more modifications of the partitioned database;
upon completion of the refreshing of the computed column statistics, marking the marking the plurality of computed column statistics as valid; and
in response to receiving, at a legacy query engine, a query on the partitioned database table, pruning unnecessary table partitions from a query strategy based on the plurality of computed column statistics,
wherein the actions further comprise:
provide an updated query engine, wherein the updated query engine is able to employ pruning based on the tree partition specification, wherein the query comprises a first query, and wherein the query strategy comprises a first query strategy; and
in response to receiving, at the updated query engine, a second query on the partitioned database table, pruning unnecessary table partitions from a second query strategy based on the tree partition specification.

15. The system of claim 14, wherein the query comprises one or more conditions including one or more key values.

16. The system of claim 14, the actions further comprising:
receiving a user-initiated request to compute updated statistics; and
computing the updated statistics.

17. The system of claim 14, the actions further comprising:
the continually refreshing the computed column statistics is carried out by a background process.

18. The system of claim 17, wherein the one or more modifications comprise a structured query language (SQL) insert statement.

19. The system of claim 14, wherein the plurality of computed column statistics is stored in one or more system tables.

20. The system of claim 14, wherein pruning the unnecessary table partitions includes simulating a linear partition synopsis based on the tree partition specification.

* * * * *